United States Patent
Inada et al.

(10) Patent No.: US 12,270,564 B2
(45) Date of Patent: Apr. 8, 2025

(54) AIR CONDITIONER

(71) Applicant: Carrier Japan Corporation, Tokyo (JP)

(72) Inventors: Yuji Inada, Fuji (JP); Ken Miura, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 145 days.

(21) Appl. No.: 18/184,247

(22) Filed: Mar. 15, 2023

(65) Prior Publication Data
US 2023/0221030 A1    Jul. 13, 2023

Related U.S. Application Data

(63) Continuation of application No. PCT/JP2020/034967, filed on Sep. 15, 2020.

(51) Int. Cl.
*F25B 49/02* (2006.01)
*F24F 1/06* (2011.01)
(Continued)

(52) U.S. Cl.
CPC .......... *F24F 11/65* (2018.01); *F24F 1/06* (2013.01); *F25B 41/30* (2021.01); *F25B 49/022* (2013.01);
(Continued)

(58) Field of Classification Search
CPC ... F24F 1/06; F24F 11/65; F25B 41/30; F25B 41/39; F25B 49/022; F25B 2313/0314;
(Continued)

(56) References Cited

U.S. PATENT DOCUMENTS

| | | | |
|---|---|---|---|
| 2005/0155369 A1 | 7/2005 | Ootori et al. | |
| 2011/0067422 A1 | 3/2011 | Ichishi et al. | |
| 2019/0331374 A1* | 10/2019 | Xue | F25B 49/022 |

FOREIGN PATENT DOCUMENTS

| | | |
|---|---|---|
| JP | H5236777 A | 9/1993 |
| JP | H9264616 A | 10/1997 |

(Continued)

OTHER PUBLICATIONS

PCT Search Report and Written Opinion mailed on Nov. 17, 2020 for PCT Application No. PCT/JP2020/034967, 18 pages.

(Continued)

*Primary Examiner* — Jonathan Bradford
(74) *Attorney, Agent, or Firm* — Lee & Hayes, P.C.

(57) ABSTRACT

According to one embodiment, an air conditioner includes an outdoor unit including a control unit which controls an operation of a compressor, an expansion valve kit, at least one air-handling unit, and a controller. The control unit or the controller adjusts, when a parameter value indicating a change in temperature of air blown out of an indoor fan or a parameter value indicating a change in temperature of air sucked by the indoor fan is not within a range defined by a first threshold and a second threshold smaller than the first threshold, each of an opening degree of an indoor expansion valve and a change period of the opening degree or each of an operation frequency of the compressor and a change period of the operation frequency.

8 Claims, 6 Drawing Sheets

(51) Int. Cl.
    *F24F 11/65*      (2018.01)
    *F25B 41/30*      (2021.01)
    *F25B 41/39*      (2021.01)
(52) U.S. Cl.
    CPC ....... *F25B 41/39* (2021.01); *F25B 2313/0314* (2013.01); *F25B 2600/025* (2013.01); *F25B 2600/0253* (2013.01); *F25B 2600/2513* (2013.01); *F25B 2700/21171* (2013.01)
(58) Field of Classification Search
    CPC ........ F25B 2600/025; F25B 2600/0253; F25B 2600/2513; F25B 2700/2117
    See application file for complete search history.

(56) References Cited

FOREIGN PATENT DOCUMENTS

| JP | H10038387 A | 2/1998 |
|----|-------------|--------|
| JP | 2016075402 A | 5/2016 |
| JP | 2016211780 A | 12/2016 |
| JP | 2018141600 A | 9/2018 |
| JP | 6479205 B2 | 3/2019 |

OTHER PUBLICATIONS

Extended European Search Report mailed on Apr. 4, 2024 for European Application No. 20954062.4, a foreign counter part of U.S. Appl. No. 18/184,247, 9 pages.

* cited by examiner

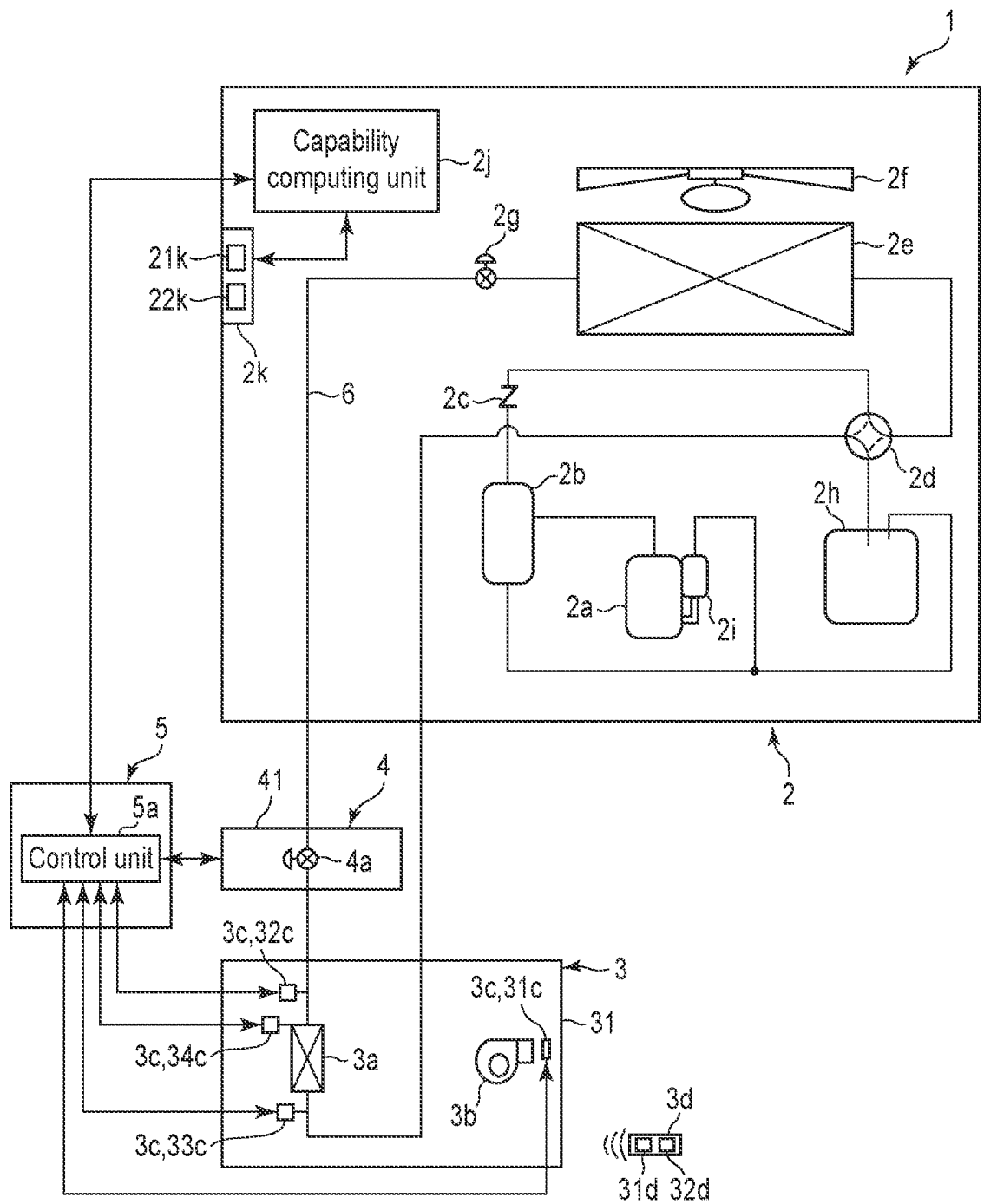
F I G. 1

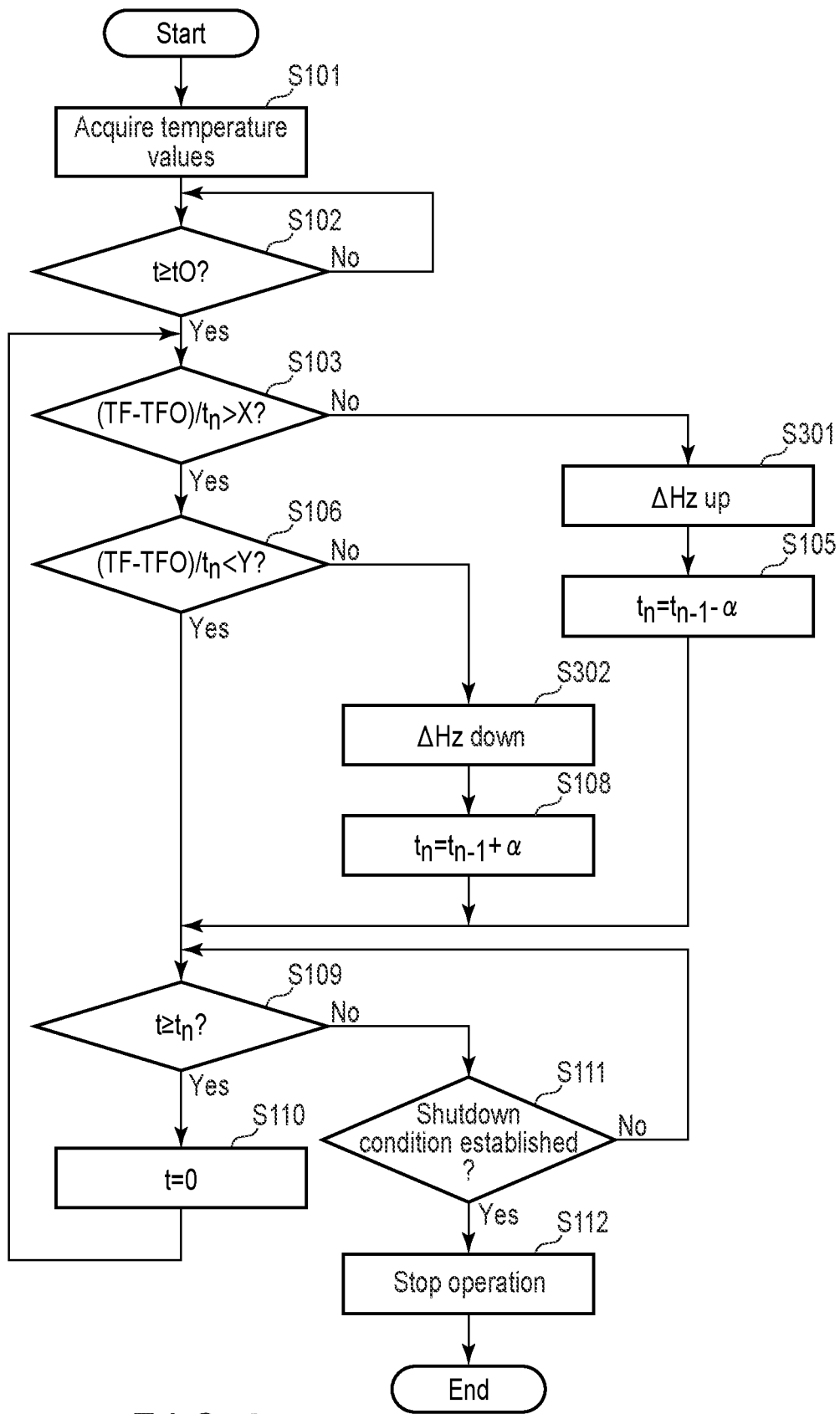
F I G. 3

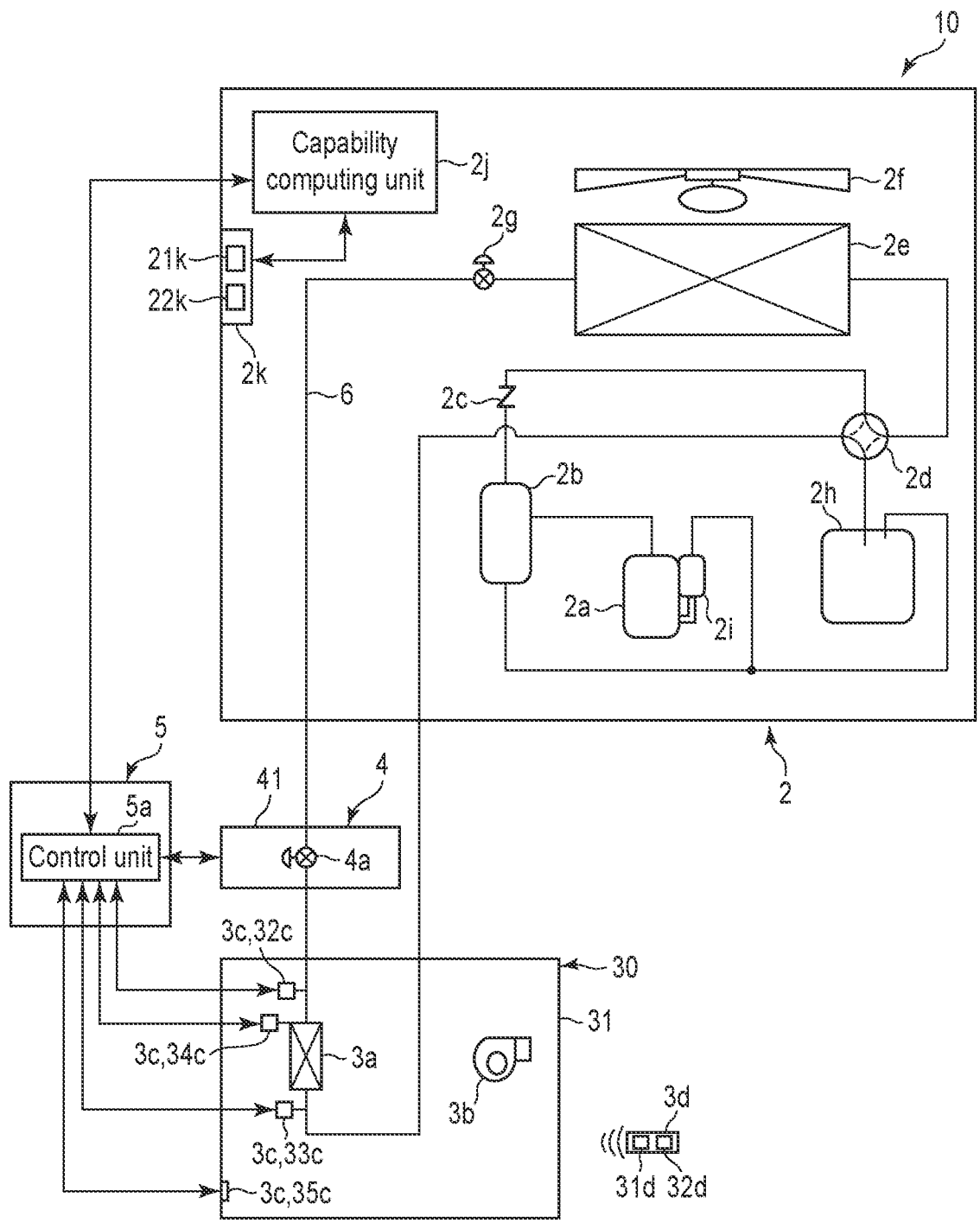
F I G. 4

AIR CONDITIONER

CROSS-REFERENCE TO RELATED APPLICATIONS

This application is a Continuation Application of PCT Application No. PCT/JP2020/034967, filed Sep. 15, 2020, the entire contents of which are incorporated herein by reference.

FIELD

Embodiments described herein relate generally to an air conditioner in which an air-handling unit is connected to an outdoor unit through an expansion valve kit.

BACKGROUND

An air conditioner in which an air-handling unit is connected to an outdoor unit through an expansion valve kit to thereby constitute a refrigerating cycle of a refrigerant and carry out air conditioning of predetermined space is known. Although the air-handling unit includes, as main constituent elements, a blower fan (indoor fan), heat exchanger, and various sensors, the unit does not include a refrigerant expanding device. The expansion valve kit is an optional device configured to control the air-conditioning capability of the air-handling unit, includes an expansion valve piping-connected to the heat exchanger of the air-handling unit, and is operation-controlled by a predetermined control unit (interface controller). The control unit operates the expansion valve of the expansion valve kit on the basis of detection data such as a blowout temperature or the like of the indoor fan detected by the sensor of the air-handling unit, and carries out capability control of the air-handling unit.

In the aforementioned air conditioner, there is sometimes a case where the air-handling unit is made by a third party different from the manufacturer of the expansion valve kit and outdoor unit. Even when devices and apparatuses of different manufacturers are provided in a mixed manner as described above, it is required that the behavior of the refrigerating cycle be stabilized and the air conditioner be appropriately operated.

The present invention has been contrived in consideration of these circumstances, and embodiments described herein aim to provide an air conditioner capable of stabilizing the behavior of a refrigerating cycle constituted in such a manner that an air-handling unit is connected to an outdoor unit through an expansion valve kit.

BRIEF DESCRIPTION OF THE DRAWINGS

FIG. 1 is a circuit diagram schematically showing the configuration of an air conditioner according to a first embodiment.

FIG. 3 is a control flowchart at the time of capability control of an air-handling unit in an air conditioner according to each of a third embodiment and fourth embodiment.

FIG. 4 is a circuit diagram schematically showing the configuration of an air conditioner according to a fifth embodiment.

DETAILED DESCRIPTION

Figure 2:
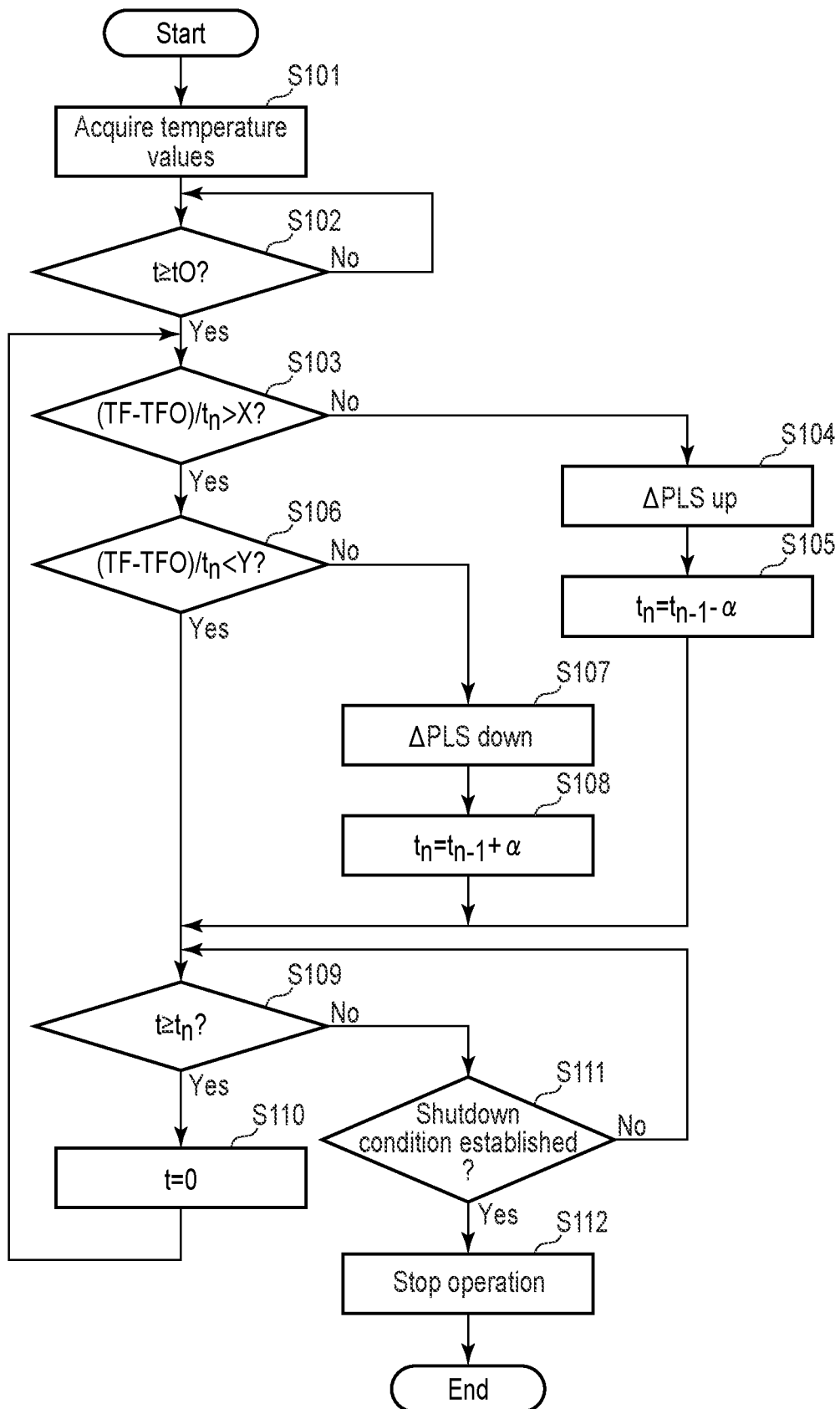
FIG. 2 is a control flowchart at the time of capability control of an air-handling unit in the air conditioner according to the first embodiment or a second embodiment.

Embodiments of the present invention will be described below with reference to the accompanying drawings.

In general, according to one embodiment, an air conditioner includes an outdoor unit, an expansion valve kit, at least one air-handling unit, and a controller. The outdoor unit includes a compressor, an outdoor heat exchanger, an outdoor fan, an outdoor expansion valve, and a control unit which controls an operation of the compressor. The expansion valve kit includes an indoor expansion valve. The air-handling unit includes an indoor heat exchanger and an indoor fan. The controller operates the indoor expansion valve. The control unit or the controller adjusts, when a parameter value indicating a change in temperature of air blown out of the indoor fan or a parameter value indicating a change in temperature of air sucked by the indoor fan is not within a range defined by a first threshold and a second threshold smaller than the first threshold, each of an opening degree of the indoor expansion valve and a change period of the opening degree or each of an operation frequency of the compressor and a change period of the operation frequency.

First Embodiment

FIG. 1 is a circuit diagram schematically showing the configuration of an air conditioner 1 according to this embodiment.

As shown in FIG. 1, the air conditioner 1 includes an outdoor unit 2, air-handling unit 3, expansion valve kit 4, and interface controller (hereinafter simply referred to as a controller) 5. The outdoor unit 2 and air-handling unit 3 are connected to each other by a flow path 6 through which a refrigerant is circulated through the expansion valve kit 4. The controller 5 is connected to each of the outdoor unit 2, air-handling unit 3, and expansion valve kit 4 by wire or wirelessly, and carries out data communication for operation control with each of these elements.

The outdoor unit 2 includes, as main elements, a compressor 2a, oil separator 2b, check valve 2c, four-way valve 2d, heat exchanger (hereinafter referred to as an outdoor heat exchanger) 2e, blower fan (hereinafter referred to as an outdoor fan) 2f, expansion valve (hereinafter referred to as an outdoor expansion valve) 2g, accumulator 2h, and suction cup 2i. The elements other than the outdoor fan 2f are piping-connected to each other in sequence and are each arranged on the flow path 6 connected to the air-handling unit 3 through the expansion valve kit 4. The outdoor fan 2f is arranged adjacent to the outdoor heat exchanger 2e.

Further, the outdoor unit 2 includes a capability computing unit 2j and setting unit 2k.

The capability computing unit 2j includes a CPU, memory, storage device (nonvolatile memory), input/output circuit, timer, and the like and executes predetermined computing processing. For example, the capability computing unit 2j controls operations of the elements of the outdoor unit 2 and controls operations of the air-handling unit 3 and expansion valve kit 4 in cooperation with the controller 5. More specifically, the capability computing unit 2j can directly control the operation frequency of the compressor 2a and opening/closing operation of an indoor expansion valve 4a of the expansion valve kit 4 to be described later. It should be noted that when controlling the opening/closing operation of the indoor expansion valve 4a, the capability computing unit 2j may adjust an opening degree of the indoor expansion valve 4a by imparting execution instructions of the control to a control unit 5a of the controller 5 to be described later and indirectly controlling the opening/closing operation of the indoor expansion valve 4a through the control unit 5a.

The setting unit 2k includes a first setting unit 21k and second setting unit 22k. The first setting unit 21k sets which of the capability computing unit 2j and control unit 5a should carry out the control of the opening/closing operation of the indoor expansion valve 4a to be described later, more specifically, control of the opening degree of the indoor expansion valve 4a and change period of the opening degree. The second setting unit 22k sets which of adjustment of the opening degree of the indoor expansion valve 4a and change period of the opening, and adjustment of the operation frequency of the compressor 2a and change period of the operation frequency should be carried out. These setting units 21k and 22k are constituted of, for example, an operation panel facing the outside when the door (illustration omitted) of the housing 21 is opened, switches, buttons, display for displaying, and the like. It should be noted that the first setting unit 21k and second setting unit 22k may also be one configuration doubling as both the units 21k and 22k or may be configurations independent of each other. Further, the setting unit 2k may also be provided as an alternative to a setting unit 3d of the air-handling unit 3 to be described later and, and can be omitted when the setting unit 3d is provided.

The air-handling unit 3 includes, as main elements, a heat exchanger (hereinafter referred to as an indoor heat exchanger) 3a, blower fan (hereinafter referred to as an indoor fan) 3b, detecting unit 3c, and setting unit 3d. It should be noted that although in FIG. 1, as an example, only one air-handling unit 3 is shown, a plurality of air-handling units may be provided. The indoor heat exchanger 3a is arranged on the piping constituting the flow path 6 connected to the outdoor unit 2 and arranged inside the housing 31. The indoor fan 3b is arranged inside the housing 31 and adjacent to the indoor heat exchanger 3a. The housing 31 defines the contour of the air-handling unit 3. The detecting unit 3c is an element configured to detect a temperature of each of the following objects, and is a temperature sensor such as a thermistor or the like.

In the example shown in FIG. 1, the detecting unit 3c includes four detecting units 31c, 32c, 33c, and 34c. The first detecting unit 31c is arranged close to the indoor fan 3b, and detects the temperature (hereinafter referred to as the blowout temperature) of air temperature-adjusted by heat exchange in the indoor heat exchanger 3a and blown out of the indoor fan 3b. The second detecting unit 32c is arranged on the flow path 6 on the liquid refrigerant side of the indoor heat exchanger 3a, and detects the temperature (hereinafter referred to as the liquid refrigerant temperature) of the liquid refrigerant flowing into or flowing out of the indoor heat exchanger 3a. The third detecting unit 33c is arranged on the flow path 6 on the gaseous refrigerant side of the indoor heat exchanger 3a, and detects the temperature (hereinafter referred to as the gaseous refrigerant temperature) of the gaseous refrigerant flowing into or flowing out of the indoor heat exchanger 3a. The fourth detecting unit 34c is arranged on the flow path 6 between the second detecting unit 32c and third detecting unit 33c, and detects the temperature (hereinafter referred to as the intermediate refrigerant temperature) of the refrigerant at the aforementioned intermediate part. Each of the detecting units 31c, 32c, 33c, and 34c imparts the detected temperature to the control unit 5a of the controller 5 to be described later.

The setting unit 3d includes a first setting unit 31d and second setting unit 32d. The first setting unit 31d sets which of the capability computing unit 2j and control unit 5a of the controller 5 to be described later should carry out the control of the opening/closing operation of the indoor expansion valve 4a of the expansion valve kit 4 to be described later, more specifically, control of the opening degree of the indoor expansion valve 4a and change period of the opening degree. The second setting unit 32d sets which of adjustment of the opening degree of the indoor expansion valve 4a and change period of the opening degree, and adjustment of the operation frequency of the compressor 2a and change period of the operation frequency should be carried out. Each of these setting units 31d and 32d is a remote controller of the air-handling unit including, for example, operation panel, switches, buttons, and display or the like for displaying. It should be noted that the first setting unit 31d and second setting unit 32d may also be one configuration doubling as both the units 31d and 32d or may be configurations independent of each other. Further, the setting unit 3d may also be provided as an alternative to the setting unit 2k of the outdoor unit 2, and can be omitted when the setting unit 2k is provided.

The expansion valve kit 4 includes, as a main element, an expansion valve (hereinafter referred to as the indoor expansion valve) 4a. As described above, although the air-handling unit 3 includes the indoor heat exchanger 3a and indoor fan 3b, the unit 3 does not include an expansion valve configured to control the air-conditioning capability thereof. For this reason, the expansion valve kit 4 is provided in the air conditioner 1 as an optional device configured to control the air-conditioning capability of the air-handling unit 3. The indoor expansion valve 4a is piping-connected between the outdoor unit 2 and air-handling unit 3 inside the housing 41, and is arranged on the flow path 6 connecting between these units 2 and 3. The housing 41 defines the contour of the expansion valve kit 4.

The controller 5 controls operations of the outdoor unit 2, air-handling unit 3, and expansion valve kit 4. Further, the controller 5 is configured in such a manner as to be able to impart instructions to control the operations of the outdoor unit 2, air-handling unit 3, and expansion valve kit 4 to the outdoor unit 2. The controller 5 includes a control unit 5a configured to execute the aforementioned control. The control unit 5a includes a CPU, memory, storage device (non-volatile memory), input/output circuit, timer, and the like, and executes predetermined computing processing. For example, the control unit 5a controls an operation of the detecting unit 3c of the air-handling unit 3, and analyzes each of temperature values acquired from the detecting unit 3c. On the basis of the analysis result, the control unit 5a carries out control of the opening/clothing operation of the indoor expansion valve 4a, control of the operation frequency of the compressor 2a, and the like. When controlling the opening/closing operation of the indoor expansion valve 4a, the control unit 5a can execute the aforementioned control by execution instructions of the control unit 5a itself or can execute the aforementioned control according to execution instructions from the capability computing unit 2j. Further, when controlling the operation frequency of the compressor 2a, the control unit 5a imparts the execution instructions of the aforementioned control to the capability computing unit 2j of the outdoor unit 2, and controls the drive of the compressor 2a, and adjusts the operation frequency through the capability computing unit 2j.

Next, an example of capability control of the air-handling unit 3 at the time of an operation of the air conditioner 1 according to this embodiment will be described below according to a control flow of the control unit 5a. In FIG. 2, a control flow of the control unit 5a at the time of capability control of the air-handling unit 3 is shown.

As shown in FIG. 2, when the operation of the air conditioner 1 is started, the control unit 5a makes the detecting unit 3c start temperature detection, and acquires detection results (temperature values) (S101). More specifically, the control unit 5a operates the detecting units 31c, 32c, 33c, and 34c and acquires the blowout temperature, liquid refrigerant temperature, gaseous refrigerant temperature, and intermediate refrigerant temperature.

Subsequently, the control unit 5a determines the capability determination possible/impossible condition. The capability determination possible/impossible condition is a condition for determining whether or not the air-handling unit 3 is in a state where the air-conditioning capability of the air-handling unit 3 can appropriately be determined, and is determined according to whether or not the air conditioner 1 has continuously been operated throughout a reference time from the start of the operation. After the start of the operation of the air conditioner 1, until the reference time elapses, the operational state of the air conditioner 1 is not stable, and there is a possibility of sampling of the air-conditioning capability of the air-handling unit 3 being unable to be appropriately carried out. Accordingly, the reference time is set in advance as a continuous operation time required for the air conditioner 1 to reach the state where the air-conditioning capability of the air-handling unit 3 is appropriately determinable. The reference time is stored in, for example, the storage device of the control unit 5a and is read into the memory at the time of determination of the capability determination possible/impossible condition. The value of the reference time can arbitrarily be set according to the performance or the like of the air conditioner 1 and is, for example, about 10 minutes.

When determining the capability determination possible/impossible condition, the control unit 5a compares the operation time (t) of the air conditioner 1 with the reference time (t0) and determines whether or not the operation time is longer than or equal to the reference time (t≥t0) (S102). The operation time is the time elapsed from the start of the operation to the time of determination of the capability determination possible/impossible condition. The control unit 5a repeats the determination of the capability determination possible/impossible condition until the operation time becomes longer than or equal to the reference time (t≥t0).

When the operation time becomes longer than or equal to the reference time, the control unit 5a determines the capability determination condition of the air-handling unit 3. The capability determination condition is a condition for determining the air-conditioning capability of the air-handling unit 3 at the time of an operation of the air conditioner 1, and is determined according to a capability determination condition parameter. The capability determination condition parameter is a value of an amount of change in the temperature difference between the blowout temperature (TF) and target blowout temperature (TFO) per predetermined time $(t_n)$ ((TF−TFO)/$t_n$). The blowout temperature (TF) is detected by the first detecting unit 31c and is imparted to the control unit 5a. The target blowout temperature (TFO) is the target temperature of air temperature-adjusted in the air-handling unit 3 and is blown out of the unit 3 and finally corresponds to the set indoor temperature. The value of the target blowout temperature (TFO) is set by, for example, the user through the setting unit 3d, and is retained in the memory of the control unit 5a. The temperature difference (TF−TFO) between the blowout temperature and target blowout temperature is an absolute value. The predetermined time $(t_n)$ is set in advance as a time interval of the capability determination of the air-handling unit 3, i.e., as a sampling time (determination interval) of the capability determination condition. The sampling time $(t_n)$ is stored in, for example, the storage device of the control unit 5a and is read into the memory at the time of determination of the capability determination condition. The aforementioned sampling time can arbitrarily be set according to the capability or the like of the air-handling unit 3 and is set to, for example, a value not exceeding the reference time, such as an initial value of about 1 to 10 minutes.

At the time of determination of the capability determination condition, two thresholds are used. A first threshold (X) is set in advance as a value defining the upper limit of the capability determination condition parameter. A second threshold (Y) is set in advance as a value defining the lower limit of the capability determination condition parameter. The first threshold and second threshold are stored in, for example, the storage device of the control unit 5a and is read into the memory at the time of determination of the capability determination condition. These thresholds can arbitrarily be set according to the air-conditioning capability or the like of the air-handling unit 3 and, for example, the first threshold is about 10° C. and second threshold is about 3° C.

When determining the capability determination condition, the control unit 5a calculates the value of the capability determination condition parameter ((TF−TFO)/$t_n$) and compares the calculated value with the first threshold (X). For example, the control unit 5a determines whether or not the value of the capability determination condition parameter exceeds the first threshold ((TF−TFO)/$t_n$>X) (S103).

When the value of the capability determination condition parameter exceeds the first threshold, the control unit 5a raises the opening degree change amount (ΔPLS) of the indoor expansion valve 4a and adjusts the opening degree of the indoor expansion valve 4a according to the opening degree change amount (S104). Thereby, the opening degree of the indoor expansion valve 4a becomes larger than that before the adjustment. The opening degree change amount of the indoor expansion valve 4a is a measure indicating the opening condition of the indoor expansion valve 4a and is a value of a variable varying according to the value of the capability determination condition parameter. For example, it is sufficient if the greater the value of the capability determination condition parameter, the greater the opening degree change amount becomes. The value of the opening degree change amount is tabulated in correlation with, for example, the value of the capability determination condition parameter, is stored in the storage device of the control unit 5a, and is read into the memory at the time of adjustment of the opening degree change amount.

Subsequently, the control unit 5a shortens the sampling time $(t_n)$. For example, the control unit 5a makes the sampling time $(t_n)$ at the time of determination of the this-time capability determination condition shorter than the sampling time $(t_{n-1})$ at the time of determination of the last-time capability determination condition by a predetermined time (α) ($t_n = t_{n-1} - α$) (S105). The sampling time $(t_n)$ is a time interval before the capability determination condition is determined next time, and corresponds to the change period of the opening degree of the indoor expansion valve 4a, in this embodiment, corresponds to the change period of the opening degree change amount (ΔPLS). The predetermined time (α) is an adjustment time of the sampling time ($t_n$), and can arbitrarily be set according to the air-conditioning capability or the like of the air-handling unit 3. The aforementioned adjustment time (α) is, for example, a value about 10% of the sampling time and is, when the sampling time is about 1 to 10 minutes, about 0.1 to 1 minute.

Conversely, when the value of the capability determination condition parameter is less than or equal to the first threshold ((TF−TFO)/$t_n$≤X) in S103, the control unit 5*a* compares the value of the capability determination condition parameter with the second threshold (Y). For example, the control unit 5*a* determines whether or not the value of the capability determination condition parameter is less than the second threshold ((TF−TFO)/$t_n$<Y) (S106).

When the value of the capability determination condition parameter is less than the second threshold, the control unit 5*a* lowers the opening degree change amount (ΔPLS) of the indoor expansion valve 4*a* and adjusts the opening degree of the indoor expansion valve 4*a* according to the aforementioned opening degree change amount (S107). Thereby, the opening of the indoor expansion valve 4*a* becomes less than that before the adjustment. Regarding the opening degree change amount of the indoor expansion valve 4*a*, for example, it is sufficient if the smaller the value of the capability determination condition parameter, the smaller the change amount becomes.

Subsequently, the control unit 5*a* prolongs the sampling time ($t_n$). For example, the control unit 5*a* makes the sampling time ($t_n$) at the time of determination of the this-time capability determination condition longer than the sampling time ($t_{n-1}$) at the time of determination of the last-time capability determination condition by the adjustment time (α) ($t_n=t_{n-1}+α$) (S108). It should be noted that although, in this case, the adjustment time (α) is made coincident with the value of the sampling time ($t_n$) at the time of shortening (S105), the adjustment time (α) may also be made different from the aforementioned sampling time ($t_n$).

Conversely, when the value of the capability determination condition parameter is greater than or equal to the second threshold ((TF−TFO)/$t_n$≥Y) in S106, the control unit 5*a* determines whether or not the air conditioner 1 is continuously operated throughout the sampling time ($t_n$) (S109). For example, the control unit 5*a* determines whether or not the operation time of the air conditioner 1 is longer than or equal to the sampling time (t≥$t_n$). This case corresponds to, when the capability determination condition is determined, the case where the value of the capability determination condition parameter is greater than or equal to the second threshold, and is less than or equal to the first threshold). In this case, the opening degree change amount (ΔPLS) of the indoor expansion valve 4*a* is maintained as it is without being adjusted, and the sampling time is maintained at the value at the time of the last-time capability determination.

Further, upon shortening of the sampling time ($t_n$) in S105 or upon prolonging of the sampling time ($t_n$) in S108, the control unit 5*a* carries out the same determination (S109).

When the air conditioner 1 is continuously operated throughout the sampling time ($t_n$), the control unit 5*a* determines the capability determination condition of the air-handling unit 3 again (S103). At this time, the control unit 5*a* resets the operation time (t) of the air conditioner 1 to 0 (t=0) (S110). Then, the control unit 5*a* appropriately repeats the subsequent processing (S104 to S108) according to the determination result of the capability determination condition.

Conversely, during the time up until the air conditioner 1 comes to be continuously operated throughout the sampling time ($t_n$), the control unit 5*a* determines a shutdown condition of the air conditioner 1 (S111). The shutdown condition is a condition for determining whether or not the operation of the air conditioner 1 should be stopped, and is determined according to, for example, whether or not the control unit 5*a* has received a signal indicating a shutdown of the air conditioner 1, or the like. The signal indicating a shutdown is transmitted by the operator or user by selecting a shutdown from the setting unit 2*k* of the outdoor unit 2 or setting unit 3*d* of the air-handling unit 3.

When the shutdown condition is not established, the controller 5*a* repeats the determination as to whether or not the air conditioner 1 is continuously operated throughout the sampling time (t≥$t_n$) (S109).

On the other hand, when the shutdown condition is established, the control unit 5*a* stops the operation of the air conditioner 1 (S112).

That is, while the air conditioner 1 is operated, a series of processing for executing the capability control of the air-handling unit 3 is repeated. Then, when the operation of the air conditioner 1 is stopped, the series of processing for executing the capability control of the air-handling unit 3 is also terminated.

As described above, according to this embodiment, when the value of the capability determination condition parameter ((TF−TFO)/$t_n$) exceeds the first threshold (X), it is possible to raise the opening degree change amount (ΔPLS) of the indoor expansion valve 4*a* and shorten the sampling time ($t_n$). The case where the value of the capability determination condition parameter exceeds the first threshold corresponds to the case where the temperature difference between the blowout temperature (TF) and target blowout temperature (TFO) is large. Accordingly, in this case, it is possible to shorten the determination interval of the capability determination condition, in other words, it is possible to shorten the change period of the opening degree change amount of the indoor expansion valve 4*a* by raising the opening degree change amount of the indoor expansion valve 4*a* and shortening the sampling time. Thereby, it is possible to adjust the opening degree of the indoor expansion valve 4*a* with a short period and make the blowout temperature in the air-handling unit 3 more quickly reach the target blowout temperature.

Further, when the value of the capability determination condition parameter ((TF−TFO)/$t_n$) is less than the second threshold (Y), it is possible to lower the opening degree change amount (ΔPLS) of the indoor expansion valve 4*a* and prolong the sampling time ($t_n$). The case where the value of the capability determination condition parameter is less than the second threshold corresponds to the case where the temperature difference between the blowout temperature (TF) and target blowout temperature (TFO) is small and hunting is caused. Accordingly, in this case, it is possible to prolong the change period of the opening degree change amount of the indoor expansion valve 4*a* by lowering the opening degree change amount of the indoor expansion valve 4*a* and prolonging the sampling time. Accordingly, it is possible to adjust the opening degree of the indoor expansion valve 4*a* with a long period, in other words, it is possible to make the change period of the opening degree change amount of the indoor expansion valve 4*a* longer than the case where the temperature difference between the blowout temperature and target blowout temperature is large, and make the blowout temperature more efficiently reach the target blowout temperature.

It should be noted that when the value of the capability determination condition parameter is greater than or equal to the second threshold and is less than or equal to the first threshold, it is possible to maintain the opening degree change amount of the indoor expansion valve 4a as it is without adjusting the amount and maintain the sampling time at the value at the time of the last-time capability determination. The case where the value of the capability determination condition parameter is greater than or equal to the second threshold and is less than or equal to the first threshold corresponds to the case where the temperature difference between the blowout temperature and target blowout temperature is comparatively stable. Accordingly, in this case, it is possible to maintain the change period of the opening degree change amount of the indoor expansion valve 4a also as it is by maintaining the opening degree change amount of the indoor expansion valve 4a and sampling time. Accordingly, it is possible to make the blowout temperature appropriately reach the target blowout temperature in both the case where the temperature difference between the blowout temperature and target blowout temperature is large and case where the aforementioned temperature difference is small.

Adjustment of the opening degree change amount of the indoor expansion valve 4a and change period of the opening degree change amount is carried out by the control unit 5a, i.e., by the controller 5. Accordingly, for example, even when the air-handling unit 3 is made by a third party different from the manufacturer of the outdoor unit 2, expansion valve kit 4, and controller 5, it is possible to appropriately control the air-conditioning capability of the air-handling unit 3. Therefore, it becomes possible to stabilize the behavior of the refrigerating cycle in the air conditioner 1 including an air-handling unit 3 made by the aforementioned third party.

It should be noted that adjustment of the opening degree change amount of the indoor expansion valve 4a and change period of the opening degree change amount may be carried out not by the control unit 5a, i.e., not by the controller 5 but by the outdoor unit 2, more specifically, by the capability computing unit 2j. Hereinafter, an embodiment in which the aforementioned adjustment is carried out by the capability computing unit 2j will be described as a second embodiment. It should be noted that the configuration of an air conditioner 1 in the second embodiment is identical to the first embodiment (FIG. 1). Accordingly, in the following, the description of the configuration of the aforementioned air conditioner is omitted (see FIG. 1) and an example of capability control of an air-handling unit 3 in the second embodiment will be described. In this case, although in the control flow of the capability computing unit 2j, the control contents are identical to steps (S101 to S111) of the control flow of the first embodiment shown in FIG. 2, the control cores are different from the first embodiment. Accordingly, in the description of the second embodiment, reference is made to the control flow shown in FIG. 2.

Second Embodiment

In this embodiment, capability control of the air-handling unit 3 including adjustment of the opening degree change amount of the indoor expansion valve 4a and change period of the opening degree change amount is executed by a capability computing unit 2j of the outdoor unit 2, the capability computing unit 2j serving as the core.

When the operation of the air conditioner 1 is started, in step S101 shown in FIG. 2, the capability computing unit 2j acquires detection values (temperature values) of temperatures detected by the detecting unit 3c from the control unit 5a (S101). More specifically, the capability computing unit 2j acquires the detection values of the blowout temperature, liquid refrigerant temperature, gaseous refrigerant temperature, and intermediate refrigerant temperature respectively detected by the detecting units 31c, 32c, 33c, and 34c.

Subsequently, the capability computing unit 2j determines the capability determination possible/impossible condition of the air-handling unit 3. When determining the capability determination possible/impossible condition, the capability computing unit 2j compares the operation time (t) of the air conditioner 1 with the reference time (t0) and determines whether or not the operation time is longer than or equal to the reference time (t≥t0) (S102). The capability computing unit 2j repeats the determination of the capability determination possible/impossible condition until the operation time becomes longer than or equal to the reference time.

When the operation time becomes longer than or equal to the reference time, the capability computing unit 2j determines the capability determination condition of the air-handling unit 3. When determining the capability determination condition, the capability computing unit 2j calculates the value of a capability determination condition parameter (($TF-TFO)/t_n$) and compares the calculated value with the first threshold (X). For example, the capability computing unit 2j determines whether or not the value of the capability determination condition parameter exceeds the first threshold (($TF-TFO)/t_n>X$) (S103).

When the value of the capability determination condition parameter exceeds the first threshold, the capability computing unit 2j raises the opening degree change amount (ΔPLS) of the indoor expansion valve 4a, and adjusts the opening degree of the indoor expansion valve 4a according to the aforementioned opening degree change amount (S104). When raising the opening degree change amount (ΔPLS) of the indoor expansion valve 4a, the capability computing unit 2j imparts the execution instructions of the control to the control unit 5a. Upon receipt of the aforementioned execution instructions, the control unit 5a raises the opening degree change amount of the indoor expansion valve 4a and operates the indoor expansion valve 4a in order to adjust the opening degree of the indoor expansion valve 4a according to the aforementioned opening degree change amount.

Subsequently, the capability computing unit 2j shortens the sampling time ($t_n$). For example, the capability computing unit 2j makes the sampling time ($t_n$) at the time of determination of the this-time capability determination condition shorter than the sampling time ($t_{n-1}$) at the time of determination of the last-time capability determination condition by an adjustment time (α) ($t_n=t_{n-1}-α$) (S105).

Conversely, when the value of the capability determination condition parameter is less than or equal to the first threshold (($TF-TFO)/t_n≤X$) in S103, the capability computing unit 2j compares the value of the capability determination condition parameter with the second threshold (Y). For example, the capability computing unit 2j determines whether or not the value of the capability determination condition parameter is less than the second threshold (($TF-TFO)/t_n<Y$) (S106).

When the value of the capability determination condition parameter is less than the second threshold, the capability computing unit 2*j* lowers the opening degree change amount (ΔPLS) of the indoor expansion valve 4*a* and adjusts the opening degree of the indoor expansion valve 4*a* according to the aforementioned opening degree change amount (S107). When lowering the opening degree change amount (ΔPLS) of the indoor expansion valve 4*a*, the capability computing unit 2*j* imparts the execution instructions of the control to the control unit 5*a*. Upon receipt of the aforementioned execution instructions, the control unit 5*a* raises the opening degree change amount of the indoor expansion valve 4*a*, and operates the indoor expansion valve 4*a* in order to adjust the opening degree of the indoor expansion valve 4*a* according to the aforementioned opening degree change amount.

Subsequently, the capability computing unit 2*j* prolongs the sampling time ($t_n$). For example, the capability computing unit 2*j* makes the sampling time ($t_n$) at the time of determination of the this-time capability determination condition longer than the sampling time ($t_{n-1}$) at the time of determination of the last-time capability determination condition by the adjustment time (α) ($t_n = t_{n-1} + α$) (S108).

Conversely, when the value of the capability determination condition parameter is greater than or equal to the second threshold (($TF - TFO)/t_n \geq Y$) in S106, the capability computing unit 2*j* determines whether or not the air conditioner 1 is continuously operated throughout the sampling time ($t_n$) (S109).

Further, upon shortening of the sampling time ($t_n$) in S105 or upon prolonging of the sampling time ($t_n$) in S108, the capability computing unit 2*j* carries out the same determination (S109).

When the air conditioner 1 is continuously operated throughout the sampling time ($t_n$), the capability computing unit 2*j* determines the capability determination condition of the air-handling unit 3 again (S103). At this time, the capability computing unit 2*j* resets the operation time (t) of the air conditioner 1 to 0 (t=0) (S110). Then, the capability computing unit 2*j* appropriately repeats the subsequent processing (S104 to S108) according to the determination result of the capability determination condition.

Conversely, during the time up until the air conditioner 1 comes to be continuously operated throughout the sampling time ($t_n$), the capability computing unit 2*j* determines the shutdown condition of the air conditioner 1 (S111). The shutdown condition is determined according to whether or not the capability computing unit 2*j* has received a signal indicating a shutdown of the air conditioner 1, or the like.

When the shutdown condition is not established, the capability computing unit 2*j* repeats the determination as to whether or not the air conditioner 1 is continuously operated throughout the sampling time ($t_n$) (S109).

On the other hand, when the shutdown condition is established, the capability computing unit 2*j* stops the operation of the air conditioner 1 (S112).

As described above, in this embodiment, adjustment of the opening degree change amount of the indoor expansion valve 4*a* and change period of the opening degree change amount is carried out by the capability computing unit 2*j*, i.e., by the outdoor unit 2. Accordingly, this embodiment produces the following effect in addition to the effect identical to the first embodiment described above. That is, according to this embodiment, even when the air conditioner 1 includes a plurality of air-handling units 3, it is possible to unitarily adjust the opening degree change amount of the indoor expansion valve 4*a* and change period of the opening degree change amount by the capability computing unit 2*j*, and collectively manage the air-conditioning capability of the air-handling units by the outdoor unit 2.

Further, in the first embodiment and second embodiment described above, when the capability control of the air-handling unit 3 is carried out, the opening degree change amount of the indoor expansion valve 4*a* and change period of the opening degree change amount are each adjusted. However, the capability control of the air-handling unit 3 can also be carried out by a method other than the adjustment of the opening degree change amount of the indoor expansion valve 4*a* and change period of the opening degree change amount. For example, it is also possible to carry out the capability control of the air-handling unit 3 by adjustment of the operation frequency of the compressor 2*a* of the outdoor unit 2 in place of or in addition to the adjustment of the opening degree change amount of the indoor expansion valve 4*a* and change period of the opening degree change amount. Hereinafter, embodiments in which the capability control of the air-handling unit 3 is carried out by adjustment of the operation frequency of the compressor 2*a* of the outdoor unit 2 will be described as a third embodiment and fourth embodiment. The third embodiment is an embodiment in which the core of the control is made the control unit 5*a*, and fourth embodiment is an embodiment in which the core of the control is made the capability computing unit 2*j*. It should be noted that the configuration of the air conditioner 1 in each of these embodiments is identical to the first embodiment (FIG. 1). Accordingly, hereinafter, a description of the aforementioned configuration of the air conditioner is omitted (see FIG. 1) and an example of capability control of the air-handling unit 3 in each of these embodiments will be described.

Third Embodiment

In FIG. 3, the control flow of a control unit 5*a* at the time of capability control of the air-handling unit 3 in this embodiment is shown. It should be noted that the control flow of the control unit 5*a* is a control flow formed by replacing a part of the control flow of the first embodiment shown in FIG. 2 with control peculiar to the third embodiment. Accordingly, control equivalent to the first embodiment described above is denoted by a step number identical to the first embodiment, a description thereof is simplified, and only the control peculiar to the third embodiment will be described in detail.

As shown in FIG. 3, when the operation of the air conditioner 1 is started, the control unit 5*a* acquires detection values (temperature values) of the blowout temperature, liquid refrigerant temperature, gaseous refrigerant temperature, and intermediate refrigerant temperature respectively from the detecting units 31*c*, 32*c*, 33*c*, and 34*c* (S101) and determines the capability determination possible/impossible condition of the air-handling unit 3. In order to determine the capability determination possible/impossible condition, the control unit 5*a* determines whether or not the operation time of the air conditioner 1 is longer than or equal to the reference time ($t \geq t0$) (S102). Then, when the operation time becomes longer than or equal to the reference time, the control unit 5*a* determines whether or not the value of the capability determination condition parameter exceeds the first threshold (($TF - TFO)/t_n > X$) (S103).

When the value of the capability determination condition parameter exceeds the first threshold, the control unit 5*a* raises the frequency change amount (ΔHz) of the compressor 2*a* and adjusts the operation frequency of the compressor 2*a* according to the aforementioned frequency change amount (S301). When raising the frequency change amount of the compressor 2a, the control unit 5a imparts the execution instructions of the control to a capability computing unit 2j. Upon receipt of the aforementioned execution instructions, the capability computing unit 2j raises the frequency change amount of the compressor 2a, and operates the compressor 2a in order to adjust the operation frequency of the compressor 2a according to the aforementioned frequency change amount. Thereby, the operation frequency of the compressor 2a becomes higher than that before the adjustment. The frequency change amount of the compressor 2a is a measure indicating the degree of change in the operation frequency of the compressor 2a, and is a value of a variable varying according to the value of the capability determination condition parameter. For example, it is sufficient if the greater the value of the capability determination condition parameter, the greater the frequency change amount becomes. The value of the frequency change amount is tabulated in correlation with the value of, for example, the capability determination condition parameter, is stored in the storage device of the control unit 5a, and is read into the memory at the time of adjustment of the frequency change amount.

Subsequently, the control unit 5a shortens the sampling time ($t_n$). For example, the control unit 5a makes the sampling time ($t_n$) at the time of determination of the this-time capability determination condition shorter than the sampling time ($t_{n-1}$) at the time of determination of the last-time capability determination condition by a predetermined time ($\alpha$) ($t_n = t_{n-1} - \alpha$) (S105). The sampling time ($t_n$) is a time interval before the capability determination condition is determined next time, and corresponds to the change period of the operation frequency of the compressor 2a, in this embodiment, corresponds to the change period of the frequency change amount ($\Delta$Hz). The predetermined time ($\alpha$) is an adjustment time of the sampling time ($t_n$), and can arbitrarily be set according to the air-conditioning capability or the like of the air-handling unit 3. Although the aforementioned predetermined time ($\alpha$) is made coincident with the adjustment time ($\alpha$) in the first embodiment described above, the predetermined time ($\alpha$) may also be different from the adjustment time ($\alpha$) in the first embodiment.

Conversely, when the value of the capability determination condition parameter is less than or equal to the first threshold ((TF−TFO)/$t_n$<X) in S103, the control unit 5a determines whether or not the value of the capability determination condition parameter is less than the second threshold ((TF−TFO)/$t_n$<Y) (S106).

When the value of the capability determination condition parameter is less than the second threshold, the control unit 5a lowers the frequency change amount ($\Delta$Hz) of the compressor 2a and adjusts the operation frequency of the compressor 2a according to the aforementioned frequency change amount (S302). When lowering the frequency change amount of the compressor 2a, the control unit 5a imparts the execution instructions of the control to the capability computing unit 2j. Upon receipt of the aforementioned execution instructions, the capability computing unit 2j lowers the frequency change amount of the compressor 2a and operates the compressor 2a in order to adjust the operation frequency of the compressor 2a according to the aforementioned frequency change amount. Thereby, the operation frequency of the compressor 2a becomes lower than that before the adjustment. Regarding the frequency change amount of the compressor 2a, it is sufficient if, for example, the smaller the value of the capability determination condition parameter, the smaller the change amount becomes.

Subsequently, the control unit 5a prolongs the sampling time ($t_n$). For example, the control unit 5a makes the sampling time ($t_n$) at the time of determination of the this-time capability determination condition longer than the sampling time ($t_{n-1}$) at the time of determination of the last-time capability determination condition by a predetermined time ($\alpha$) ($t_n = t_{n-1} + \alpha$) (S108). It should be noted that although in this embodiment, the predetermined time ($\alpha$) in this case is made coincident with the value of the sampling time ($t_n$) at the time of shortening (S105), the predetermined time ($\alpha$) may also be made different from the aforementioned sampling time ($t_n$).

Conversely when the value of the capability determination condition parameter is greater than or equal to the second threshold ((TF−TFO)/$t_n$≥Y) in S106, the control unit 5a determines whether or not the air conditioner 1 is continuously operated throughout the sampling time (t≥$t_n$) (S109). This case corresponds to the case where, at the time of determination of the capability determination condition, the value of the capability determination condition parameter is greater than or equal to the second threshold and is less or equal to the first threshold. In this case, the frequency change amount ($\Delta$Hz) of the compressor 2a is maintained as it is without being adjusted and sampling time is maintained at the value at the time of the last-time capability determination.

Further, upon shortening of the sampling time ($t_n$) in S105 or upon prolonging of the sampling time ($t_n$) in S108, the control unit 5a carries out the same determination (S109).

When the air conditioner 1 is continuously operated throughout the sampling time, the control unit 5a determines the capability determination condition of the air-handling unit 3 again (S103). At this time, the control unit 5a resets the operation time (t) of the air conditioner 1 to 0 (t=0) (S110). Then, the control unit 5a appropriately repeats the subsequent processing (S104 to S108) according to the determination result of the capability determination condition.

Conversely, during the time up until the air conditioner 1 comes to be continuously operated throughout the sampling time ($t_n$), the control unit 5a determines the shutdown condition of the air conditioner 1 (S111). When the shutdown condition is not established, the controller 5a repeats the determination as to whether or not the air conditioner 1 is continuously operated throughout the sampling time ($t_n$) (S109).

On the other hand, when the shutdown condition is established, the control unit 5a stops the operation of the air conditioner 1 (S112).

As described above, according to this embodiment, when the value of the capability determination condition parameter ((TF−TFO)/$t_n$) exceeds the first threshold (X), it is possible to raise the frequency change amount ($\Delta$Hz) of the compressor 2a and shorten the sampling time ($t_n$). The case where the value of the capability determination condition parameter exceeds the first threshold corresponds to the case where the temperature difference between the blowout temperature (TF) and target blowout temperature (TFO) is large. Accordingly, in this case, it is possible to shorten the determination interval of the capability determination condition, in other words, it is possible to shorten the change period of the frequency change amount of the compressor 2a by raising the frequency change amount of the compressor 2a and shortening the sampling time. Thereby, it is possible to adjust the operation frequency of the compressor 2a with a short period and make the blowout temperature in the air-handling unit 3 more quickly reach the target blowout temperature.

Further, when the value of the capability determination condition parameter $((TF-TFO)/t_n)$ is less than the second threshold (Y), it is possible to lower the frequency change amount (ΔHz) of the compressor 2a and prolong the sampling time $(t_n)$. The case where the value of the capability determination condition parameter is less than the second threshold corresponds to the case where the temperature difference between the blowout temperature (TF) and target blowout temperature (TFO) is small and hunting is caused. Accordingly, in this case, it is possible to prolong the change period of the frequency change amount of the compressor 2a by lowering the frequency change amount of the compressor 2a and prolonging the sampling time. Accordingly, it is possible to adjust the operation frequency of the compressor 2a with a long period, in other words, it is possible to make the change period of the frequency change amount of the compressor 2a longer than the case where the temperature difference between the blowout temperature and target blowout temperature is large, and make the blowout temperature more efficiently reach the target blowout temperature.

It should be noted that when the value of the capability determination condition parameter is greater than or equal to the second threshold and is less than or equal to the first threshold, it is possible to maintain the frequency change amount of the compressor 2a as it is without adjusting the frequency change amount and maintain the sampling time at the value at the time of the last-time capability determination. The case where the value of the capability determination condition parameter is greater than or equal to the second threshold and is less than or equal to the first threshold corresponds to the case where the temperature difference between the blowout temperature and target blowout temperature is comparatively stable. Accordingly, in this case, it is possible to maintain the change period of the frequency change amount of the compressor 2a also as it is by maintaining the frequency change amount of the compressor 2a and sampling time. Accordingly, it is possible to make the blowout temperature appropriately reach the target blowout temperature in both the case where the temperature difference between the blowout temperature and target blowout temperature is large and case where the aforementioned temperature difference is small.

In this embodiment, adjustment of the frequency change amount of the compressor 2a and change period of the frequency change amount is carried out in place of the adjustment of the opening degree change amount of the indoor expansion valve 4a and change period of the opening degree change amount. Accordingly, it is possible to adjust the circulating volume of the refrigerant in the overall air conditioner 1, and hence it becomes possible to stabilize the behavior of the refrigerating cycle. It should be noted that the adjustment of the frequency change amount of the compressor 2a may also be carried out in addition to the adjustment of the opening degree change amount of the indoor expansion valve 4a. In this case, it is sufficient if the processing of step S104 shown in FIG. 2 is carried out before or after, for example, the processing of step S301 shown in FIG. 3. Further, it is sufficient if the processing of step S107 shown in FIG. 2 is carried out before or after, for example, the processing of step S302 shown in FIG. 3. Thereby, it becomes possible to execute both the adjustment of the frequency change amount of the compressor 2a and adjustment of the opening degree change amount of the indoor expansion valve 4a.

It should be noted that even when, for example, the air-handling unit 3 is made by a third party different from the manufacturer of the outdoor unit 2, expansion valve kit 4, and controller 5, it is possible to appropriately control the air-conditioning capability of the air-handling unit 3 and stabilize the behavior of the refrigerating cycle in the air conditioner 1, this being identical to the first embodiment.

Fourth Embodiment

In this embodiment, capability control of the air-handling unit 3 including adjustment of the opening degree change amount of the indoor expansion valve 4a and change period of the opening degree change amount is executed by a capability computing unit 2j of the outdoor unit 2, the capability computing unit 2j serving as the core. In this case, although in the control flow of the capability computing unit 2j, the control contents are identical to the steps of the control flow of the third embodiment shown in FIG. 3, the control cores are different from the third embodiment. Accordingly, in the description of the fourth embodiment, reference is made to the control flow shown in FIG. 3.

When the operation of the air conditioner 1 is started, the capability computing unit 2j acquires detection values (temperature values) of the blowout temperature, liquid refrigerant temperature, gaseous refrigerant temperature, and intermediate refrigerant temperature respectively from the detecting units 31c, 32c, 33c, and 34c (S101) and determines the capability determination possible/impossible condition of the air-handling unit 3. In order to determine the capability determination possible/impossible condition, the capability computing unit 2j determines whether or not the operation time of the air conditioner 1 is longer than or equal to the reference time (t≥t0) (S102). Then, when the operation time becomes longer than or equal to the reference time, the capability computing unit 2j determines whether or not the value of the capability determination condition parameter exceeds the first threshold $((TF-TFO)/t_n>X)$ (S103).

When the value of the capability determination condition parameter exceeds the first value, the capability computing unit 2j raises the frequency change amount (ΔHz) of the compressor 2a and adjusts the operation frequency of the compressor 2a according to the aforementioned frequency change amount (S301). Thereby, the operation frequency of the compressor 2a becomes higher than that before the adjustment.

Subsequently, the capability computing unit 2j shortens the sampling time $(t_n)$. For example, the capability computing unit 2j makes the sampling time $(t_n)$ at the time of determination of the this-time capability determination condition shorter than the sampling time $(t_{n-1})$ at the time of determination of the last-time capability determination condition by a predetermined time (α) $(t_n=t_{n-1}-α)$ (S105).

Conversely, when the value of the capability determination condition parameter is less than or equal to the first threshold $((TF-TFO)/t_n≤X)$, the capability computing unit 2j determines whether or not the value of the capability determination condition parameter is less than the second threshold $((TF-TFO)/t_n<Y)$ (S106).

When the value of the capability determination condition parameter is less than the second threshold, the capability computing unit 2j lowers the frequency change amount (ΔHz) of the compressor 2a and adjusts the operation frequency of the compressor 2a according to the aforementioned frequency change amount (S302). Thereby, the operation frequency of the compressor 2a becomes lower than that before the adjustment.

Subsequently, the capability computing unit 2j prolongs the sampling time ($t_n$). For example, the capability computing unit 2j makes the sampling time ($t_n$) at the time of determination of the this-time capability determination condition longer than the sampling time ($t_{n-1}$) at the time of determination of the last-time capability determination condition by the predetermined time (α) ($t_n=t_{n-1}+α$) (S108). It should be noted that although, in this embodiment, the predetermined time (α) is made coincident with the value of the sampling time ($t_n$) at the time of shortening (S105), the predetermined time (α) may also be made different from the aforementioned sampling time ($t_n$).

Conversely, when the value of the capability determination condition parameter is greater than or equal to the second threshold (($TF-TFO$)/$t_n$≥Y) in S106, the capability computing unit 2j determines whether or not the air conditioner 1 is continuously operated throughout the sampling time ($t_n$) (S109). In this case, the frequency change amount (ΔHz) of the compressor 2a is maintained as it is without being adjusted, and the sampling time is maintained at the value at the time of the last-time capability determination.

Further, upon shortening of the sampling time ($t_n$) in S105 or upon prolonging of the sampling time ($t_n$) in S108, the capability computing unit 2j carries out the same determination (S109).

When the air conditioner 1 is continuously operated throughout the sampling time, the capability computing unit 2j determines the capability determination condition of the air-handling unit 3 again (S103). At this time, the control unit 5a resets the operation time (t) of the air conditioner 1 to 0 (t=0) (S110). Then, the capability computing unit 2j appropriately repeats the subsequent processing (S104 to S108) according to the determination result of the capability determination condition.

Conversely, during the time up until the air conditioner 1 comes to be continuously operated throughout the sampling time ($t_n$), the capability computing unit 2j determines the shutdown condition of the air conditioner 1 (S111). When the shutdown condition is not established, the capability computing unit 2j repeats the determination as to whether or not the air conditioner 1 is continuously operated throughout the sampling time ($t_n$) (S109).

On the other hand, when the shutdown condition is established, the capability computing unit 2j stops the operation of the air conditioner 1 (S112).

As described above, in this embodiment, adjustment of the frequency change amount of the compressor 2a and change period of the frequency change amount is carried by the capability computing unit 2j, i.e., by the outdoor unit 2. Accordingly, this embodiment produces the following effect in addition to the effect identical to the third embodiment described above. That is, according to this embodiment, even when the air conditioner 1 includes a plurality of air-handling units 3, it is possible to unitarily adjust the frequency change amount of the compressor 2a and change period of the frequency change amount by the capability computing unit 2j, and collectively manage the air-conditioning capabilities of the air-handling units by the outdoor unit 2.

Here, in the first to fourth embodiments described above, as the capability determination condition parameter, a value of an amount of change in the temperature difference between the blowout temperature (TF) and target blowout temperature (TFO) per predetermined time ($t_n$) (($TF-TFO$)/ $t_n$) is used. However, the value of the capability determination condition parameter is not limited to the above and other values can also be used. Hereinafter, an embodiment in which a value other than the value of an amount of change in the temperature difference between the blowout temperature and target blowout temperature per predetermined time (($TF-TFO$)/$t_n$) is used will be described as a fifth embodiment.

Fifth Embodiment

FIG. 4 is a circuit diagram schematically showing the configuration of an air conditioner 10 according to this embodiment. It should be noted that the configuration of the air conditioner 10 in the fifth embodiment is basically identical to the configuration of the air conditioner 1 (FIG. 1) in the first embodiment. More specifically, accordingly, configurations identical to or similar to the air conditioner 1 are denoted by reference signs identical to the air conditioner 1 in the drawings and descriptions of the configurations are omitted.

As shown in FIG. 4, an air-handling unit 30 includes, as main elements, a heat exchanger (indoor heat exchanger) 3a, blower fan (indoor fan) 3b, detecting unit 3c, and setting unit 3d. It should be noted that although in FIG. 4, as an example, only one air-handling unit 30 is shown, a plurality of air-handling units 30 may also be provided.

The detecting unit 3c includes four detecting units 32c, 33c, 34c, and 35c. That is, in the example shown in FIG. 4, the fifth detecting unit 35c is provided in place of the first detecting unit 31c of the example shown in FIG. 1. The detecting units 32c, 3c, 34c, and 35c are temperature sensors such as thermistors or the like. The fifth detecting unit 35c is arranged close to, for example, a suction opening (illustration omitted) of air (indoor air) of the indoor space formed in the housing 31, and detects a temperature (hereinafter referred to as a suction temperature) of the indoor air to be sucked by the indoor fan 3b. The indoor air is sucked into the inside of the housing 31 from the suction opening by driving of the indoor fan 3b and is temperature-adjusted by heat exchange in the indoor heat exchanger 3a. That is, the suction temperature corresponds to the temperature of the indoor air before being temperature-adjusted by heat exchange in the indoor heat exchanger 3a, in short, the indoor temperature. The fifth detecting unit 35c imparts the detected suction temperature to the control unit 5a of the controller 5. It should be noted that the fifth detecting unit 35c may also be provided in addition to the detecting unit 3c of the example shown in FIG. 1, and may coexist with the first detecting unit 31c.

In this embodiment, as the capability determination condition parameter, a value of an amount of change in the temperature difference between the suction temperature (TA) and target suction temperature (TAO) per sampling time ($t_n$) (($TA-TAO$)/$t_n$) is used. The target suction temperature (TAO) is the target temperature of air sucked before being temperature-adjusted in the air-handling unit 3, and finally corresponds to the set indoor temperature. The value of the target suction temperature (TAO) is set by, for example, the user through the setting unit 3d, and is retained in the memory of the control unit 5a. The temperature difference between the suction temperature (TA) and target suction temperature (TAO) is an absolute value.

Therefore, according to this embodiment, when determining the capability determination condition, the control unit 5a or capability computing unit 2j calculates the value of the capability determination condition parameter (($TF-TFO$)/$t_n$)

according to the values of the suction temperature (TA) and target suction temperature (TAO), and compares the calculated value with the first threshold (X) and second threshold (Y). For example, the control unit 5a or capability computing unit 2j determines whether or not the value of the capability determination condition parameter exceeds the first threshold $((TA-TAO)/t_n>X)$. Further, for example, the control unit 5a or capability computing unit 2j determines whether or not the value of the capability determination condition parameter is less than the second threshold $((TA-TAO)/t_n<Y)$.

Figure 5:
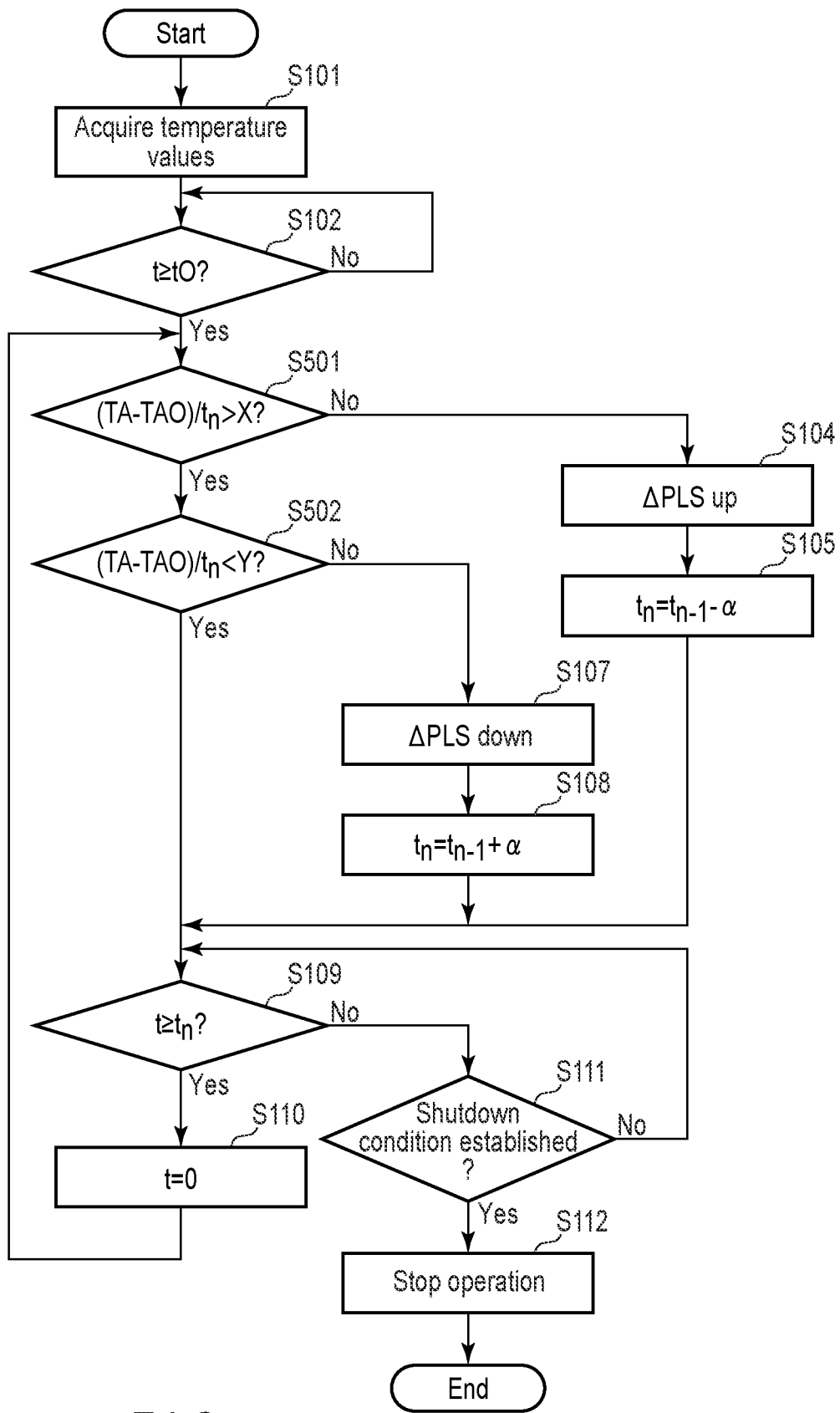
FIG. 5 is an example of a control flowchart at the time of capability control of an air-handling unit in the air conditioner according to the fifth embodiment.
Figure 6:
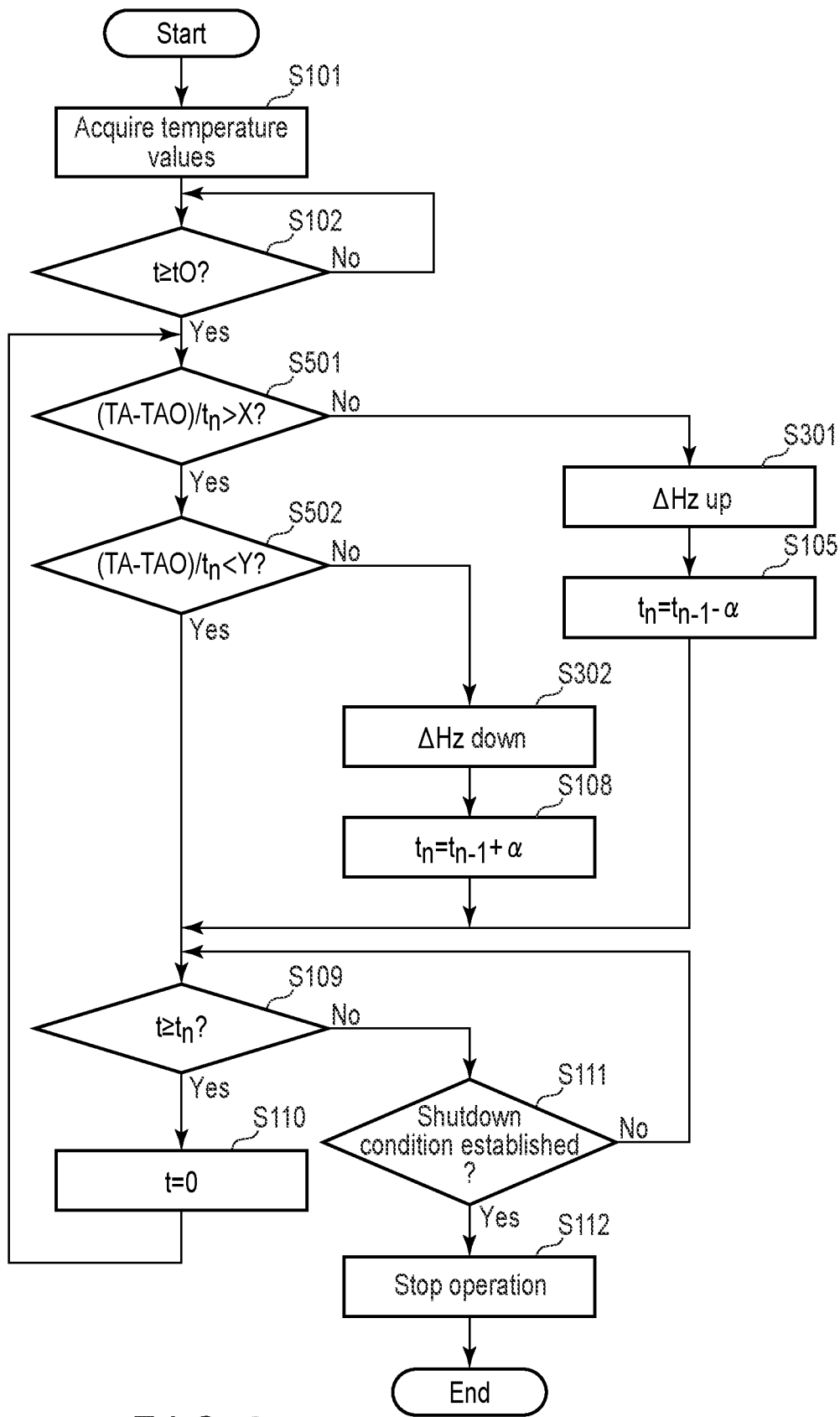
FIG. 6 is another example of a control flowchart at the time of capability control of the air-handling unit in the air conditioner according to the fifth embodiment.

In each of FIG. 5 and FIG. 6, a control flow of the control unit 5a or capability computing unit 2j at the time of capability control of the air-handling unit 30 according to this embodiment is shown. FIG. 5 is a control flow of a case where the opening degree change amount of the indoor expansion valve 4a and change period of the opening degree change amount are each adjusted. FIG. 6 is control flow of a case where the frequency change amount of the compressor 2a and change period of the frequency change amount are each adjusted.

When the opening degree change amount of the indoor expansion valve 4a and change period of the opening degree change amount are each adjusted, it is sufficient if, as shown in FIG. 5, in steps 501 and 502, the value of the capability determination condition parameter $((TA-TAO)/t_n)$ is compared with the first threshold (X) and second threshold (Y) and determination of the capability determination condition is carried out. Control contents other than the above are identical to steps (FIG. 2) of the control flow of each of the first embodiment and second embodiment described above.

When the frequency change amount of the compressor 2a and change period of the frequency change amount are adjusted, it is sufficient if, as shown in FIG. 6, in steps 501 and 502, the value of the capability determination condition parameter $((TA-TAO)/t_n)$ is compared with the first threshold (X) and second threshold (Y) and determination of the capability determination condition is carried out. Control contents other than the above are identical to steps (FIG. 3) of the control flow of each of the third embodiment and fourth embodiment described above.

Thereby, in this embodiment too, it is possible to produce an effect identical to the effect produced in each of the first to fourth embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An air conditioner comprising:
   an outdoor unit including a compressor, an outdoor heat exchanger, an outdoor fan, an outdoor expansion valve, and a control unit which controls an operation of the compressor;
   an expansion valve kit including an indoor expansion valve;
   at least one air-handling unit including an indoor heat exchanger and an indoor fan; and
   a controller which operates the indoor expansion valve, wherein
   the control unit or the controller adjusts, when a parameter value indicating a change in temperature of air blown out of the indoor fan or a parameter value indicating a change in temperature of air sucked by the indoor fan is not within a range defined by a first threshold and a second threshold smaller than the first threshold, each of an opening degree of the indoor expansion valve and a change period of the opening degree or each of an operation frequency of the compressor and a change period of the operation frequency.

2. The air conditioner of claim 1, wherein
   when the parameter value exceeds the first threshold, the control unit or the controller raises the opening degree of the indoor expansion valve and shortens the change period of the opening degree, and
   when the parameter value is less than the second threshold, the control unit or the controller lowers the opening degree of the indoor expansion valve and prolongs the change period of the opening degree.

3. The air conditioner of claim 2, wherein
   the control unit imparts instructions to adjust each of the opening degree of the indoor expansion valve and the change period of the opening degree to the controller and, upon receipt of the instructions, the controller adjusts each of the opening degree of the indoor expansion valve and the change period of the opening degree.

4. The air conditioner of claim 1, wherein
   when the parameter value exceeds the first threshold, the control unit or the controller raises the operation frequency of the compressor and shortens the change period of the operation frequency, and
   when the parameter value is less than the second threshold, the control unit or the controller lowers the operation frequency of the compressor and prolongs the change period of the operation frequency.

5. The air conditioner of claim 4, wherein
   the controller imparts instructions to adjust each of the operation frequency of the compressor and the change period of the operation frequency to the control unit and, upon receipt of the instructions, the control unit adjusts each of the operation frequency of the compressor and the change period of the operation frequency.

6. The air conditioner of claim 1, wherein
   a parameter value indicating a temperature change of air blown out of the indoor fan is a value obtained by dividing a temperature difference between a temperature of the air blown out of the indoor fan and a target temperature of the air blown out of the indoor fan by the change period of the opening degree or by the change period of the operation frequency, and
   a parameter value indicating a temperature change of the air sucked by the indoor fan is a value obtained by dividing a temperature difference between a temperature of air sucked by the indoor fan and a target temperature of the air sucked by the indoor fan by the change period of the opening degree or by the change period of the operation frequency.

7. The air conditioner of claim 1, wherein
   the air-handling unit or the outdoor unit includes a first setting unit that sets which of the control unit and the controller should adjust the opening degree of the indoor expansion valve and the change period of the opening degree or the operation frequency of the compressor and the change period of the operation frequency.

8. The air conditioner of claim 1, wherein
the air-handling unit or the outdoor unit includes a second setting unit that sets which of adjustment of the opening degree of the indoor expansion valve and the change period of the opening degree and adjustment of the operation frequency of the compressor and the change period of the operation frequency should be carried out.

* * * * *